(12) United States Patent
Newbold

(10) Patent No.: US 11,634,059 B2
(45) Date of Patent: Apr. 25, 2023

(54) TRAY TABLE TUNING MECHANISM FOR PASSENGER SEAT

(71) Applicant: Safran Seats USA LLC, Gainesville, TX (US)

(72) Inventor: Tyler Newbold, Sherman, TX (US)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 17/466,885

(22) Filed: Sep. 3, 2021

(65) Prior Publication Data

US 2023/0073445 A1    Mar. 9, 2023

(51) Int. Cl.
| | | |
|---|---|---|
| *B60N 3/00* | (2006.01) | |
| *B61D 37/00* | (2006.01) | |
| *B64D 11/06* | (2006.01) | |

(52) U.S. Cl.
CPC ............. *B60N 3/002* (2013.01); *B61D 37/00* (2013.01); *B64D 11/0638* (2014.12)

(58) Field of Classification Search
CPC .. A47C 7/70; A47C 7/64; B60N 3/004; B60N 3/002; B60N 3/007; B64D 111/0638
USPC ..................... 108/44, 46; 297/162, 161, 160
See application file for complete search history.

(56) References Cited

U.S. PATENT DOCUMENTS

| | | | |
|---|---|---|---|
| 1,731,293 A * | 10/1929 | Chapman ............... | A47C 7/70 297/162 |
| 2,687,336 A | 8/1954 | Smith | |
| 3,368,842 A * | 2/1968 | Polsky ................... | A47C 7/70 297/150 |
| 4,944,552 A | 7/1990 | Harris | |
| 5,221,070 A * | 6/1993 | Heilmer ................. | A47C 7/70 248/458 |
| 5,511,493 A | 4/1996 | Kanehl, Jr. | |
| 5,547,247 A * | 8/1996 | Dixon .................... | A47C 7/70 297/145 |
| 5,588,697 A | 12/1996 | Yoshida | |
| 6,220,658 B1 * | 4/2001 | Lukawski ............... | A47C 7/70 297/145 |
| 6,375,257 B1 * | 4/2002 | Wooding ................ | A47C 7/70 248/278.1 |
| 6,427,957 B1 | 8/2002 | Finneman | |
| 6,520,091 B1 | 2/2003 | Dettmers | |

(Continued)

FOREIGN PATENT DOCUMENTS

| | | | | |
|---|---|---|---|---|
| GB | 2598170 A | * | 2/2022 | ............... A47C 7/70 |
| JP | 2011079436 A | | 4/2011 | |

*Primary Examiner* — Jose V Chen
(74) *Attorney, Agent, or Firm* — Kilpatrick Townsend & Stockton LLP

(57) ABSTRACT

Described are tray table tuning mechanisms for a passenger seat. The tray table tuning mechanisms can include a pivot limiting member, a paddle arm deployment member, an adjustment plate, and a paddle arm. The paddle arm deployment member and the adjustment plate may be pivoted relative to the pivot limiting member. The paddle arm can include at least one stop member and may be pivotably coupled to the paddle arm deployment member. Additionally, the paddle arm may be pivoted between a stowed state and a deployed state. In the deployed state, the stop member can abut a portion of the adjustment plate to limit rotation of the paddle arm deployment member in a first direction.

16 Claims, 7 Drawing Sheets

(56) References Cited

U.S. PATENT DOCUMENTS

| | | | |
|---|---|---|---|
| 7,726,732 B1 | 6/2010 | Keating | |
| 8,672,400 B2 * | 3/2014 | Henderson | B64D 11/0638 |
| | | | 297/162 |
| 10,172,467 B1 * | 1/2019 | Shih | A47C 7/70 |
| 2003/0188672 A1 | 10/2003 | Parent | |
| 2007/0227407 A1 | 10/2007 | Cartensen | |
| 2008/0073946 A1 * | 3/2008 | Maione | A47C 7/705 |
| | | | 297/161 |
| 2008/0197678 A1 * | 8/2008 | Olarte | A47C 7/70 |
| | | | 297/162 |
| 2009/0026812 A1 * | 1/2009 | Figueras Mitjans | A47C 7/624 |
| | | | 297/162 |
| 2010/0090504 A1 * | 4/2010 | Brink | A47B 83/02 |
| | | | 297/162 |
| 2010/0243839 A1 | 9/2010 | Westerink | |
| 2010/0319588 A1 | 12/2010 | Hanna | |
| 2011/0067606 A1 * | 3/2011 | Sundarrao | A47C 7/705 |
| | | | 108/44 |
| 2011/0101740 A1 * | 5/2011 | Koh | A47C 7/70 |
| | | | 297/162 |
| 2012/0204771 A1 | 8/2012 | Fukuhara | |
| 2012/0306241 A1 | 12/2012 | Winter | |
| 2014/0110977 A1 * | 4/2014 | Madrigal | A47C 7/705 |
| | | | 297/173 |
| 2014/0300148 A1 | 10/2014 | Frost | |
| 2014/0312669 A1 | 10/2014 | Zheng | |
| 2018/0170549 A1 | 6/2018 | Jussli | |
| 2018/0279790 A1 * | 10/2018 | Pozzi | B64D 11/0646 |
| 2018/0339630 A1 | 11/2018 | Akaike | |
| 2020/0215950 A1 | 7/2020 | Gomez | |
| 2021/0120961 A1 * | 4/2021 | Griepentrog | A47B 83/02 |
| 2022/0227277 A1 * | 7/2022 | Du | B60N 3/002 |

* cited by examiner

TRAY TABLE TUNING MECHANISM FOR PASSENGER SEAT

FIELD OF THE INVENTION

The field of the invention relates to passenger seats, and, more particularly, to tray table assemblies for passenger seats.

BACKGROUND

Passenger vehicles, such as aircraft, buses, trains, ships, and automobiles, often include at least one passenger seats in which passengers may be seated or otherwise use during travel. A passenger seat may include a tray table assembly that may be used for various purposes including deploying for holding food, stowing for allowing passengers or other suitable individuals to move with respect to the passenger seat, and the like, Contemporary mechanisms for deploying or stabilizing tray tables may include springs or other mechanisms that limit the tray table. The springs may wear quickly, which can lead to the tray table rotating beyond an acceptable rotational limit. And, the other mechanisms may limit or otherwise prevent the table from sitting at a desirable height or angle with respect to the passenger seat, the passenger, or any other suitable individual using the passenger seat.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a tray table tuning mechanism can include a pivot limiting member, a paddle arm deployment member, an adjustment plate, and a paddle arm. The paddle arm deployment member and the adjustment plate may be pivoted relative to the pivot limiting member. The paddle arm can include at least one stop member and may be pivotably coupled to the paddle arm deployment member. Additionally, the paddle arm may be pivoted between a stowed state and a deployed state. In the deployed state, the stop member can abut a portion of the adjustment plate to limit rotation of the paddle arm deployment member in a first direction.

In some embodiments, at least one of the paddle arm deployment member or the adjustment plate may be pivoted about a first axis. In certain embodiments, the paddle arm may be pivoted about a second axis that may be substantially perpendicular to the first axis. In various embodiments, the adjustment plate can include at least one slot and the paddle arm deployment member can include at least one slot member extending from the paddle arm deployment member and at least partially through the at least one slot. In some embodiments, the at least one slot member may be moved along the at least one slot as the paddle arm deployment member pivots.

In certain embodiments, the pivot limiting member may include a first screw that can limit a maximum rotation of the paddle arm deployment member, a second screw that can limit a maximum rotation of the adjustment plate, and a third screw that can limit a maximum rotation of the paddle arm. In various embodiments, the third screw can determine an angle of deployment of the paddle arm. In some embodiments, in the deployed state, the stop member can also abut a portion of the pivot limiting member to limit rotation of the paddle arm in a second direction.

According to certain embodiments of the present invention, a method for using a tray table tuning mechanism that can include a pivot limiting member, a paddle arm deployment member, an adjustment plate, and a paddle arm, can include various operations. The method can include rotating the paddle arm deployment member relative to the adjustment plate. The method can include rotating the paddle arm relative to the paddle arm deployment member to a deployed state. In the deployed state, at least one stop member extending from the paddle arm can abut a portion of the adjustment plate to limit rotation of the paddle arm deployment member in a first direction.

In some embodiments, in the deployed state, the stop member extending from the paddle arm may also abut a portion of the pivot limiting member to limit rotation of the paddle arm in a second direction. In certain embodiments, rotating the paddle arm deployment member can include rotating the paddle arm deployment member about a first axis, and rotating the paddle arm can include rotating the paddle arm about a second axis that may be substantially perpendicular to the first axis. In various embodiments, rotating the paddle arm deployment member can include moving at least one slot member extending from the paddle arm deployment member and at least partially through at least one slot that may be defined by the adjustment plate.

In some embodiments, a maximum rotation of the paddle arm deployment member may be determined by a first screw extending from the pivot limiting member. In certain embodiments, the method can additionally include rotating the adjustment plate such that a maximum rotation of the adjustment plate may be determined by a second screw extending from the pivot limiting member. In various embodiments, a maximum rotation of the paddle arm may be determined by a third screw extending from the pivot limiting member.

According to certain embodiments of the present invention, a passenger seat can include an arm rest; and a tray table tuning mechanism that may be coupled to the arm rest. The tray table tuning mechanism can include a pivot limiting member, a paddle arm deployment member, an adjustment plate, and a paddle arm. The paddle arm deployment member and the adjustment plate may be pivoted relative to the pivot limiting member. The paddle arm may be pivotably coupled to the paddle arm deployment member and may be pivoted between a stowed state and a deployed state. The paddle arm can include at least one stop member. In the deployed state, the stop member can abut a portion of the adjustment plate to limit rotation of the paddle arm deployment member in a first direction.

In some embodiments, the pivot limiting member may be fixed relative to the arm rest. In certain embodiments, at least one of the paddle arm deployment member or the adjustment plate may be pivoted about a first axis, and the paddle arm may be pivoted about a second axis that may be substantially perpendicular to the first axis. In various embodiments, the adjustment plate can include at least one slot, and the paddle arm deployment member can include at least one slot member extending from the paddle arm deployment member and at least partially through the at least one slot. The at least one slot member may be moved along the at least one slot as the paddle arm deployment member pivots. In some embodiments, the pivot limiting member can include a first screw that limits a maximum rotation of the paddle arm deployment member, can include a second screw that limits a maximum rotation of the adjustment plate, and can include a third screw that limits a maximum rotation of the paddle arm.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide tray table assemblies having tray table tuning mechanisms for passenger seats. While the tray table assemblies and the tray table tuning mechanisms are discussed for use with aircraft seats, they are by no means so limited. Rather, embodiments of the tray table assemblies and the tray table tuning mechanisms described herein may be used in passenger seats or other seats of any type or otherwise as desired.

Figure 1:
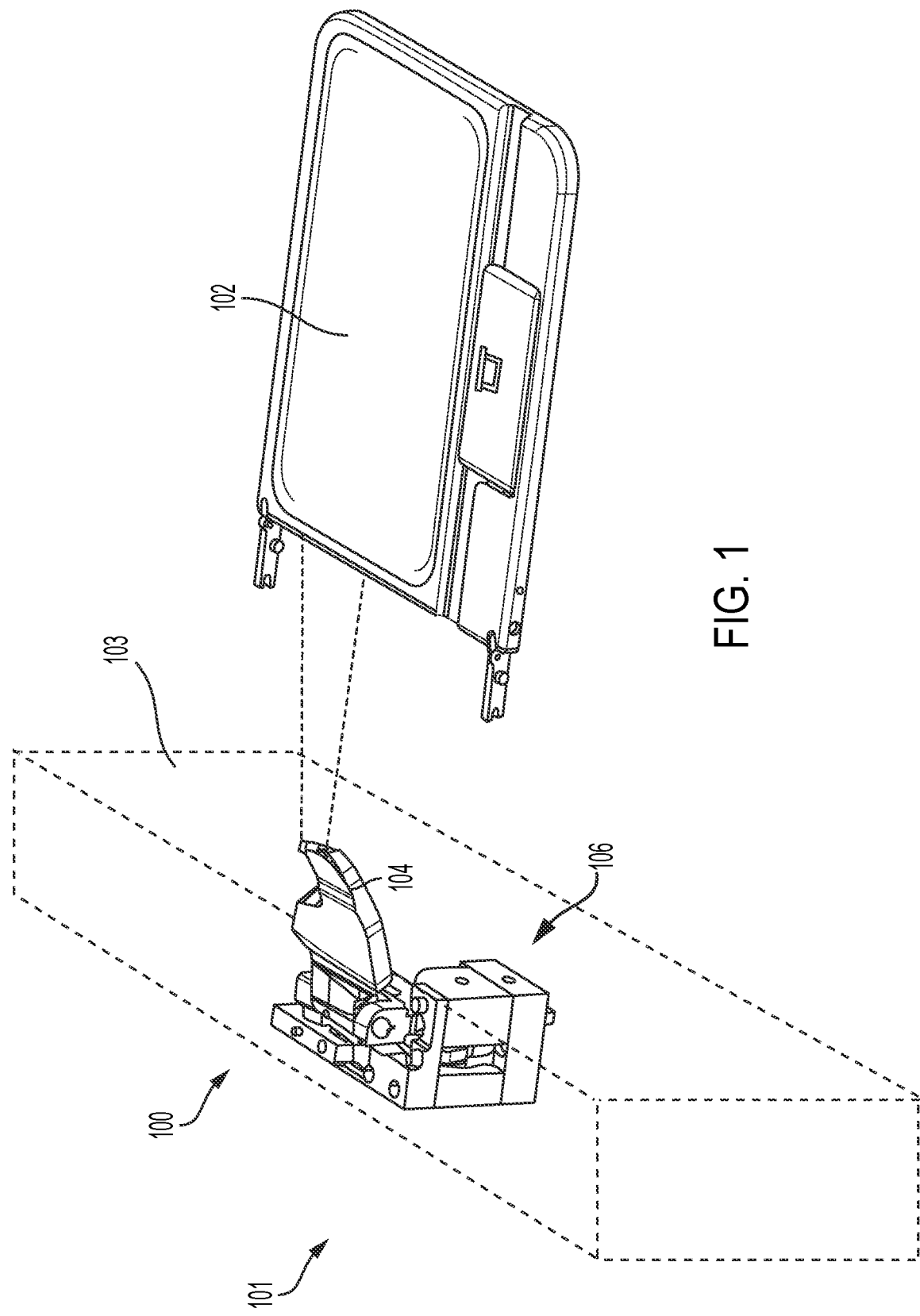
FIG. 1 is a perspective view of a table assembly of a passenger seat according to certain embodiments of the present invention.

FIG. 1 illustrates a partial perspective view of a passenger seat 101 according to certain embodiments of the present invention. The passenger seat 101 may include a subset of parts or components of a passenger seat that may be positioned in a passenger vehicle, such as an aircraft, train, and the like, and that may be used by a passenger or other individual associated with the passenger vehicle. The passenger seat 101 may include a passenger seat arm 103 and a table assembly 100 that may be supported by and/or relative to the passenger seat arm 103.

The table assembly 100 may include a tray table 102, a paddle arm 104, and a tray table tuning mechanism 106. The paddle arm 104 may be mechanically or otherwise suitably coupled to the tray table 102 and to the tray table tuning mechanism 106. In some embodiments, screws, bolts, rivets, or other mechanical or chemical fasteners may couple the paddle arm 104 to the tray table 102, to the tray table tuning mechanism 106, to other suitable components, or to a combination thereof. In other embodiments, the paddle arm 104 may be coupled to the tray table 102 via at least one additional component of the table assembly 100. Additionally, the tray table tuning mechanism 106 may be mechanically or otherwise suitably coupled to the passenger seat arm 103, an armrest, or other suitable type of passenger seat arm of the passenger seat 101. In some embodiments, when stowed, the tray table 102, the paddle arm 104, and the tray table tuning mechanism 106 may be at least partially contained within the passenger seat arm 103.

In some embodiments, the tray table tuning mechanism 106 enables the tray table 102 to be deployed for use such as for holding food or other suitable items associated with the passenger or other individual using the passenger seat. While the tray table 102 is deployed, the tray table tuning mechanism 106 may also enable the tray table 102 to be positioned at a set and/or adjustable height and angle with respect to the passenger seat 101, the passenger, or any other suitable individual using the tray table 102. For example, the tray table tuning mechanism 106 may enable at least one angle with respect to the tray table 102, to the paddle arm 104, or a combination thereof, to be adjusted. Additionally, a usable lifetime of the tray table tuning mechanism 106 may be longer than that of one formed of existing components (e.g., springs, etc.), which may allow the tray table 102 to maintain stability for an increased amount of time and/or usage as compared to other mechanisms.

Figure 2:
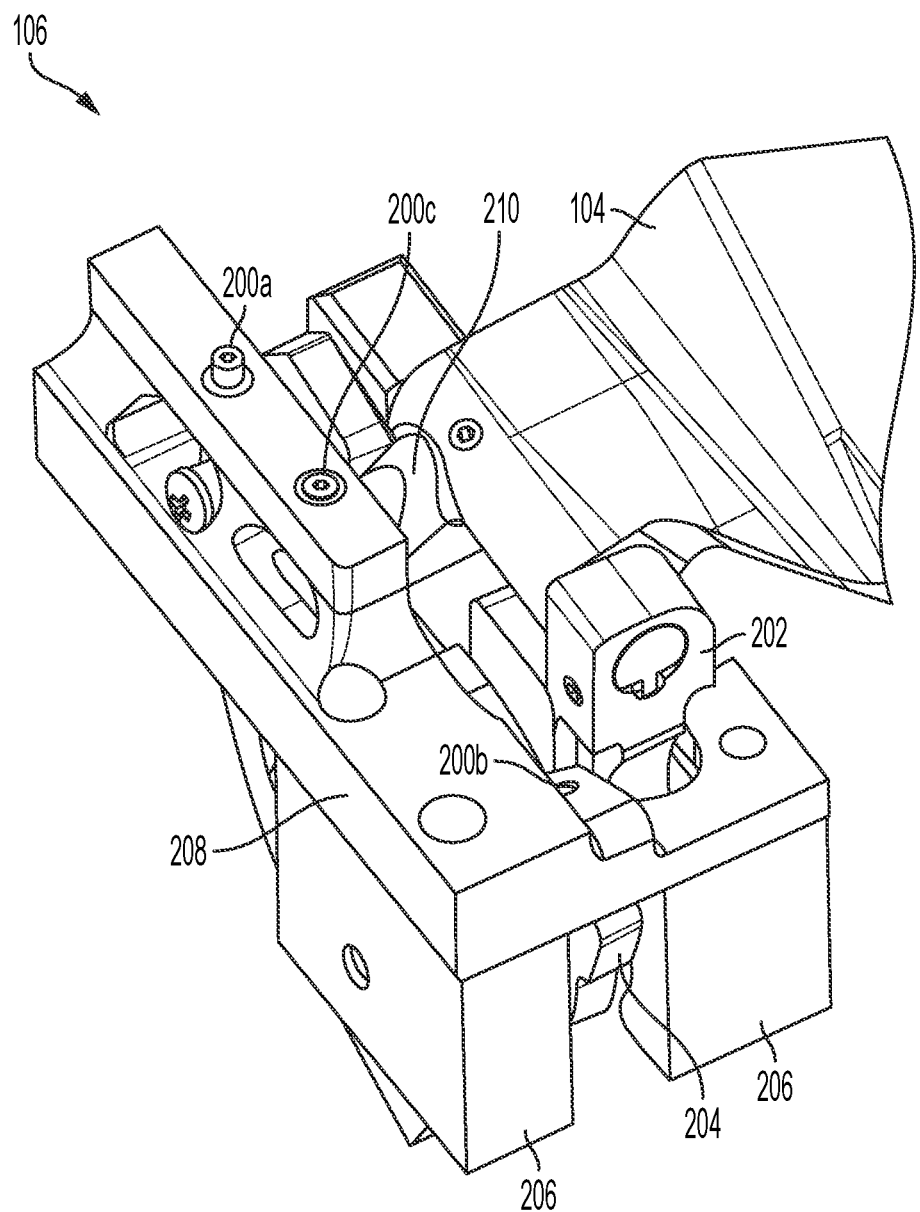
FIG. 2 is a perspective view of a tray table tuning mechanism according to certain embodiments of the present invention.
Figure 3:
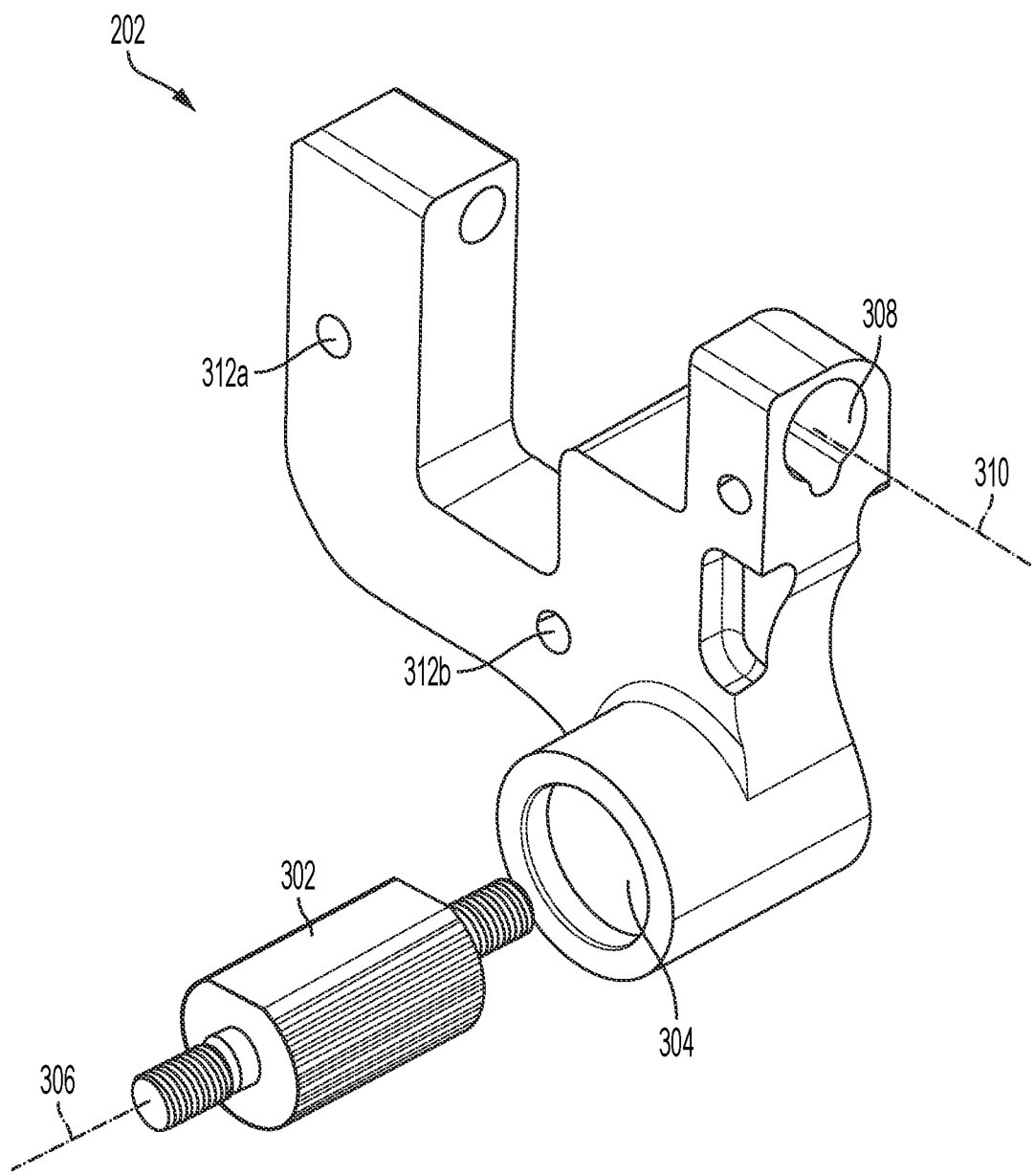
FIG. 3 is a perspective view of a paddle arm deployment member of the tray table tuning mechanism of FIG. 2.
Figure 4:
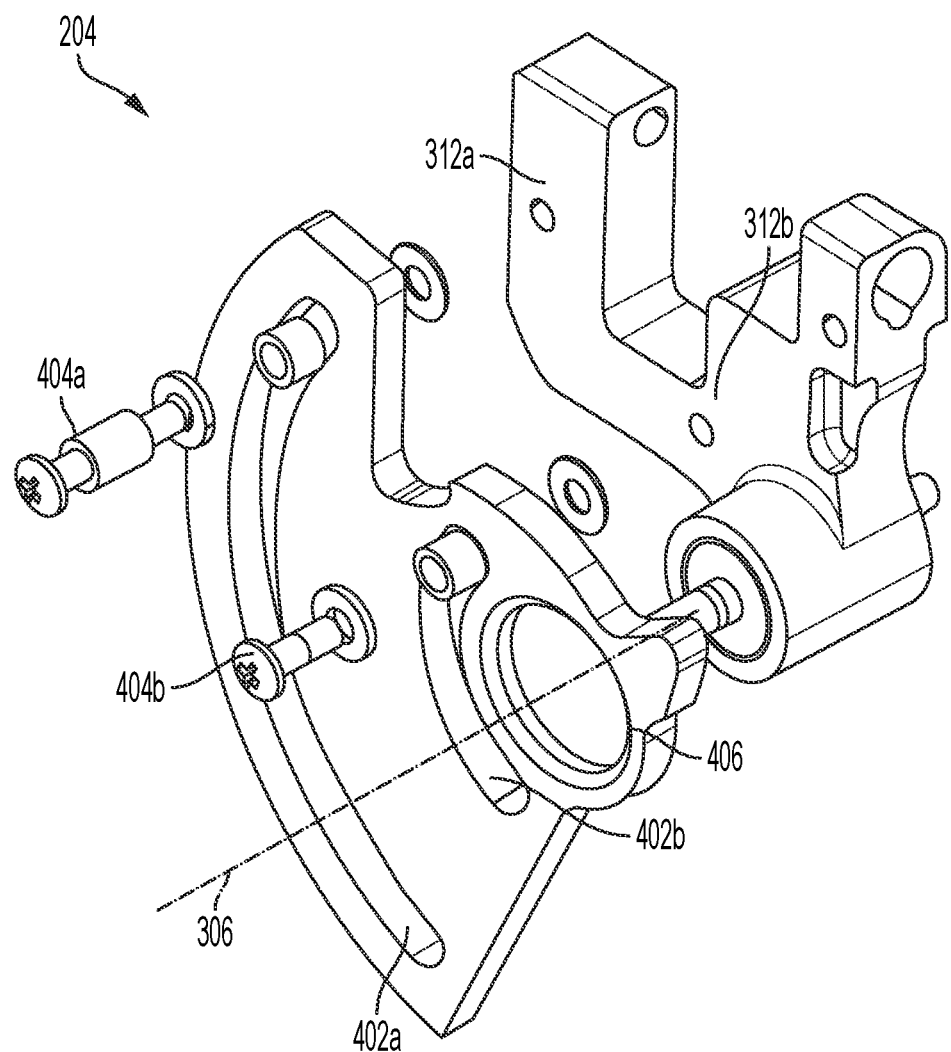
FIG. 4 is a perspective view of an adjustment plate of the tray table tuning mechanism of FIG. 2.
Figure 5:
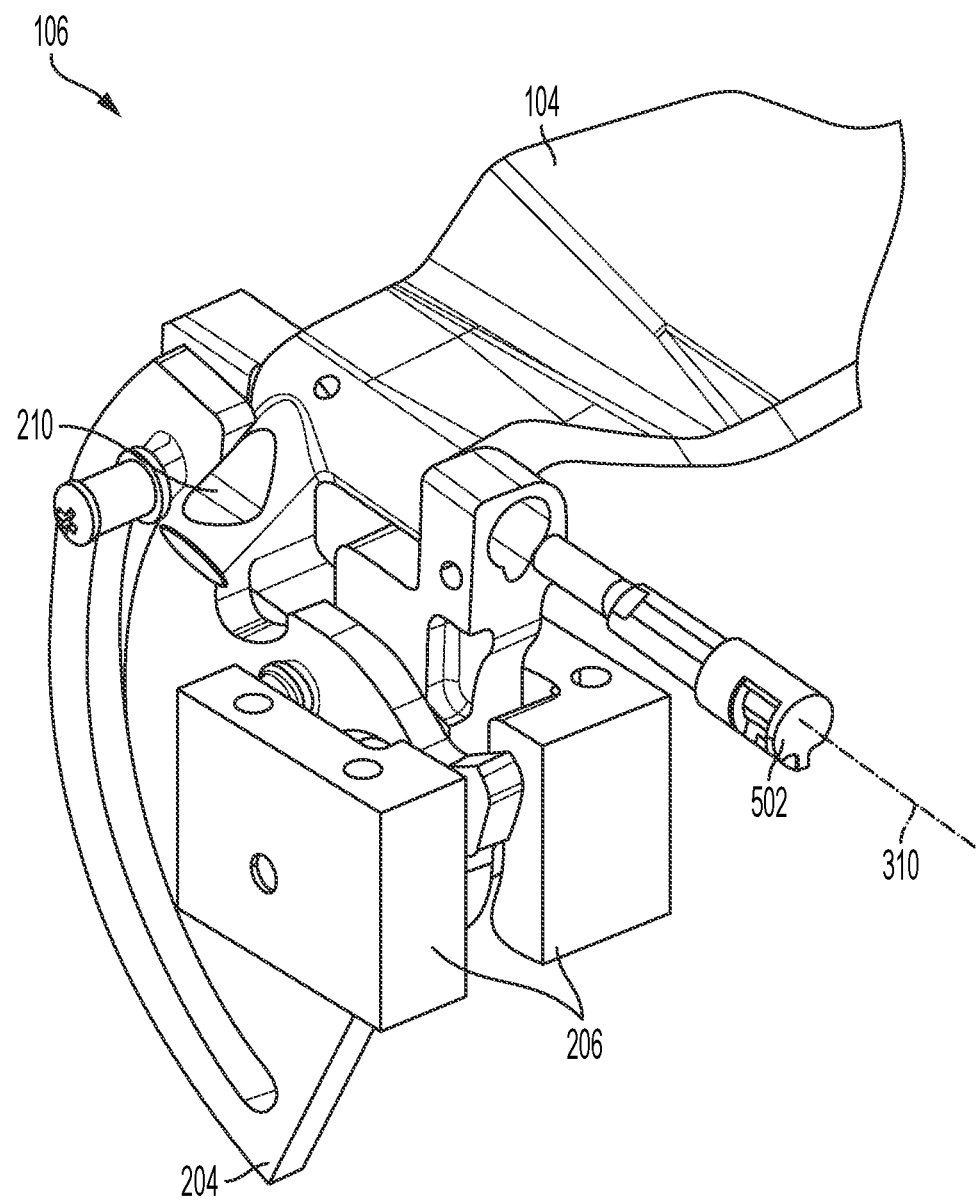
FIG. 5 is another perspective view of the tray table tuning mechanism of FIG. 2.
Figure 6:
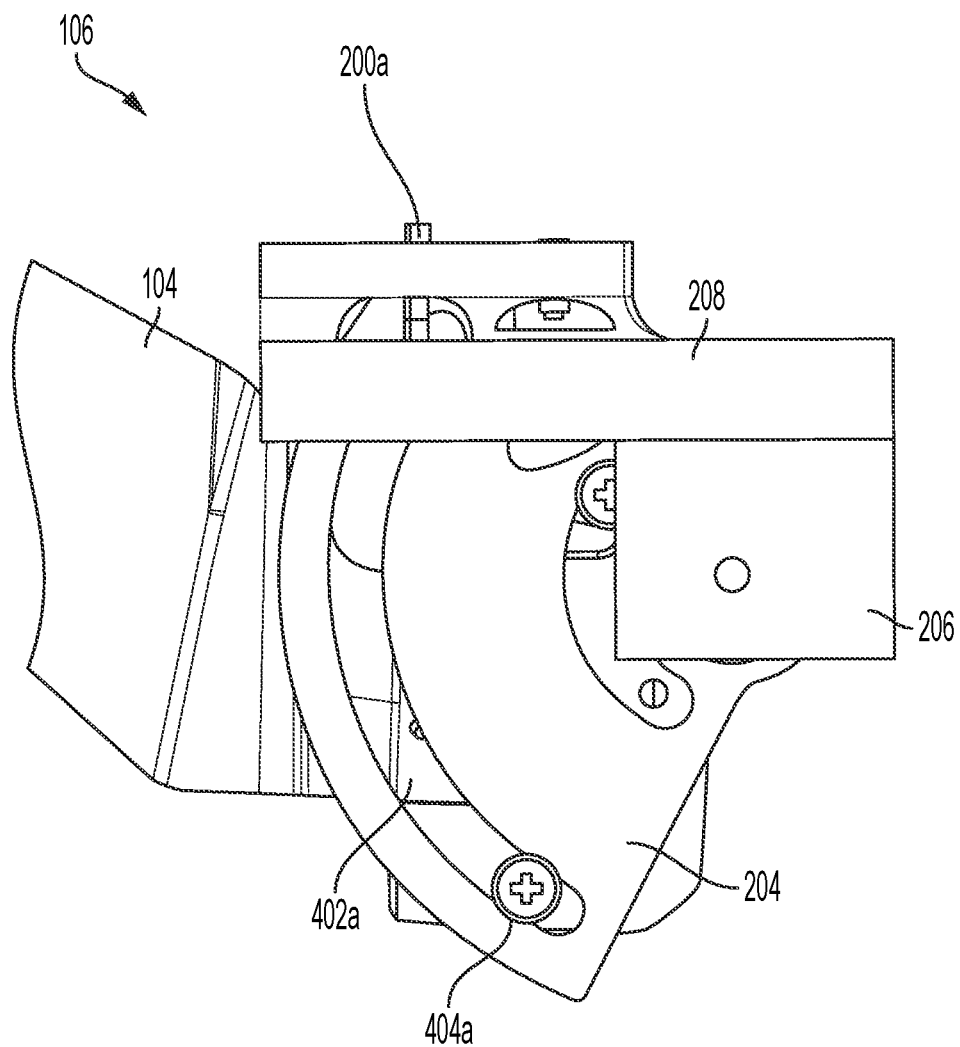
FIG. 6 is a side view of the tray table tuning mechanism of FIG. 2.
Figure 7:
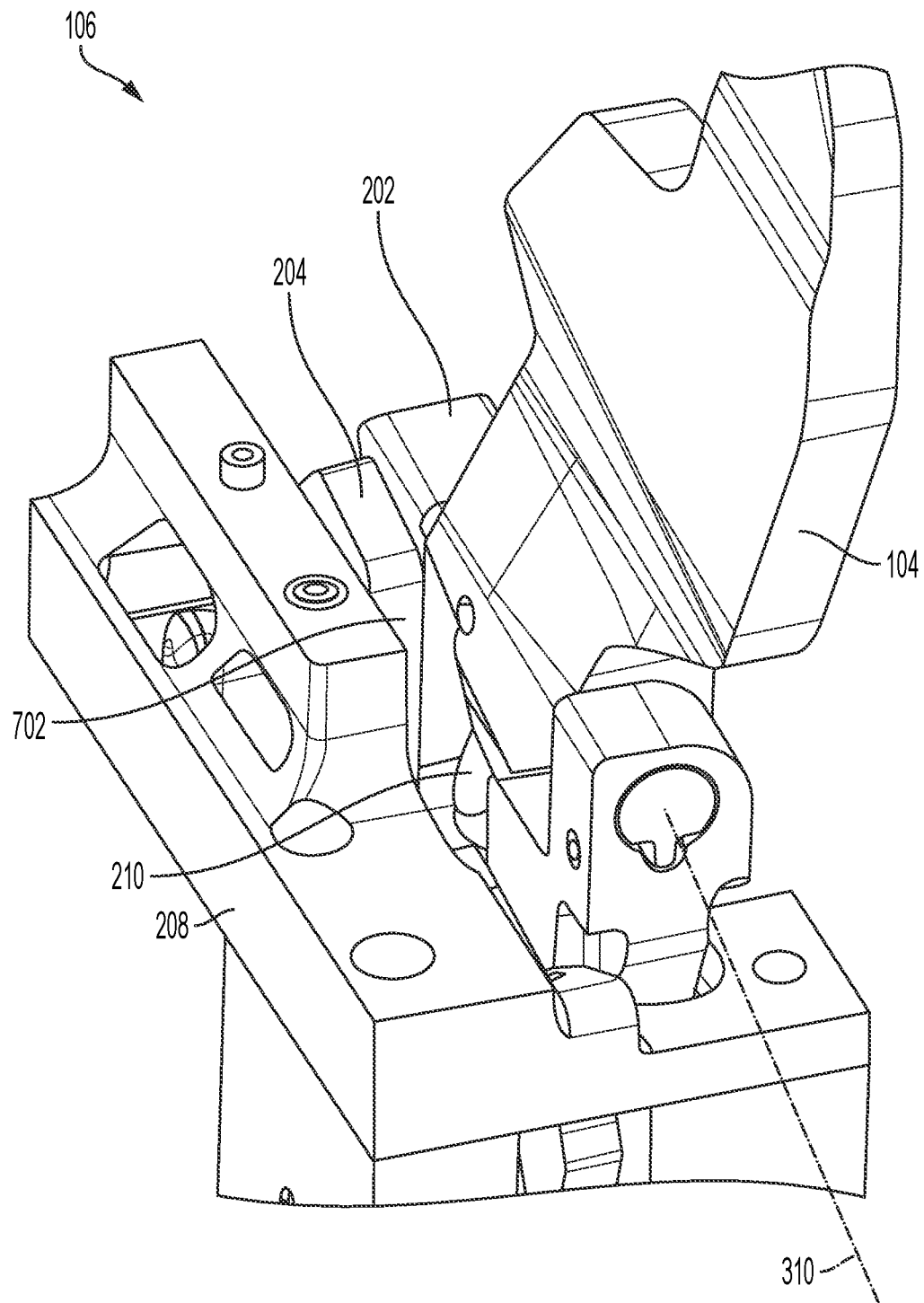
FIG. 7 is another perspective view of the tray table tuning mechanism of FIG. 2.

FIGS. 2 and 6-7 illustrate a tray table tuning mechanism 106 according to various embodiments. FIGS. 3-5 illustrate partial and/or exploded views of elements of the tray table tuning mechanism according to various embodiments. In some embodiments, the tray table tuning mechanism 106 includes at least four components: the paddle arm 104, a paddle arm deployment member 202, an adjustment plate 204, and a pivot limiting member 208. In further embodiments, the tray table tuning mechanism 106 may include additional or fewer elements or components as desired.

The elements or components of the tray table tuning mechanism 106 may be constructed from various suitable materials as desired, including but not limited to, stainless steel, aramid fibers, polycarbonate, polypropylene, aluminum, aluminum alloys, magnesium, magnesium alloys, other metallic materials or non-metallic materials, composite materials, combinations thereof, or other suitable materials. In certain embodiments, at least one element or component of the tray table tuning mechanism 106 may optionally be constructed from a material that is different from the material used for another element or component of the tray table tuning mechanism 106. For example, the paddle arm 104 may be constructed from a first material, and the pivot limiting member 208 may be constructed from a second material that may be different from the first material. In further embodiments, at least two of the elements or components of the tray table tuning mechanism 106 may be constructed from the same material.

FIG. 2 is a perspective view of a tray table tuning mechanism 106 according to certain embodiments of the present invention. The tray table tuning mechanism 106 may include the paddle arm 104, the paddle arm deployment member 202, the adjustment plate 204, at least one mount member 206, and the pivot limiting member 208. In some embodiments, the pivot limiting member 208 may be coupled to or integrally formed with the at least one mount member 206. The tray table tuning mechanism 106 may also include three screws 200a-c that may control, limit, or otherwise adjust deployment parameters associated with the tray table 102, the paddle arm 104, the paddle arm deployment member 202, the adjustment plate 204, other suitable components of the tray table tuning mechanism 106, or a combination thereof.

In some embodiments, the paddle arm deployment member 202 is pivotably coupled to at least one of the at least one mount member 206 or the pivot limiting member 208 so that the paddle arm deployment member 202 is pivotable relative to the at least one mount member 206 and/or the pivot limiting member 208. For example, the paddle arm deployment member 202 may be pivotably coupled to the at least one mount member 206 using a hinge extending at least partially through the at least one mount member 206 and the paddle arm deployment member 202, as described in more detail below in reference to FIG. 3. At least one of the at least one mount member 206 or the pivot limiting member 208 may be stationary or fixed relative to a passenger seat arm or other portion of a passenger seat.

In some embodiments, the adjustment plate 204 is pivotably coupled to the at least one mount member 206, the paddle arm deployment member 202, the pivot limiting member 208, other suitable components of the tray table tuning mechanism 106, or a combination thereof. In some embodiments, the adjustment plate 204 is pivotable relative to at least one of the at least one mount member 206 or the pivot limiting member 208.

The paddle arm 104 may be pivotably coupled to the paddle arm deployment member 202. In some embodiments, the paddle arm 104 may be pivoted between at least a stowed state and a deployed state. In the stowed state of the paddle arm 104, as best illustrated in FIG. 7, at least a portion of the paddle arm 104 is substantially parallel to the paddle arm deployment member 202 so that the paddle arm deployment member 202, and thus the paddle arm 104 and the tray table 102, may be rotated to be positioned at least partially within a passenger seat arm or other suitable component of a passenger seat. In the deployed state, the tray table 102 may deployed and available for use, e.g., holding food. Additionally, the paddle arm 104 may include at least one stop member 210 that may be positioned such that when the paddle arm 104 is in the deployed state, the stop member 210 may abut a portion of the adjustment plate 204 for limiting a rotation of the paddle arm deployment member 202 in a first direction. In the stowed state, the stop member 210 may be substantially parallel to the paddle arm deployment member 202.

In some embodiments, the screws 200a-c may be included in, or can extend from, the pivot limiting member 208. The first screw 200a may be a first screw and may limit or otherwise adjust a maximum rotation of the paddle arm deployment member 202. The screw 200b may be a second screw that may limit or otherwise adjust a maximum rotation of the adjustment plate 204. The third screw 200c may be a third screw that may limit or otherwise adjust a maximum rotation of the paddle arm 104. Additionally, the third screw 200c may determine an angle of deployment of the paddle arm 104.

As best illustrated in FIG. 3, the paddle arm deployment member 202 may include a first hinge 302 that may be positioned at least partially in the paddle arm deployment member 202 within a first opening 304 of the paddle arm deployment member 202. A first axis 306 of the tray table tuning mechanism 106 may extend through a center of the first opening 304 and the first hinge 302 when the first hinge 302 is positioned in the first opening 304. For example, the first hinge 302 may be positioned in the first opening 304 along, or substantially parallel to, the first axis 306 of the tray table tuning mechanism 106. The paddle arm deployment member 202 may additionally include a second opening 308. A second axis 310 of the tray table tuning mechanism 106 may extend through a center of the second opening 308 and may be substantially perpendicular, or in some embodiments not parallel, to the first axis 306. Additionally, the paddle arm deployment member 202 may include holes 312a-b, which may be threaded to receive mechanical coupling devices such as screws, bolts, or other suitable mechanical coupling devices.

As best illustrated in FIG. 4, the adjustment plate 204 may include at least one slot, e.g., slots 402a-b. In some embodiments, at least one slot member, e.g., slot members 404a-b, may be positioned at least partially in at least one of the holes 312a-b and may be positioned at least partially through at least one of the corresponding slots 402a-b. For example, the slot member 404a may extend from the threaded hole 312a of the paddle arm deployment member 202 and may be positioned through the slot 402a. In further embodiments, at least one of the slot members 404a-b may be integrally formed with the paddle arm deployment member 202. The slot members 404 may be any number of mechanical coupling devices or related material such as screws, bolts, rivets, nuts, washers, bearings, other suitable mechanical coupling devices, or a combination thereof.

In some embodiments, the adjustment plate 204 may include a third opening 406 that may enable the adjustment plate 204 to be pivotally coupled to at least one of the paddle arm deployment member 202 or the first hinge 302. For example, at least one of the paddle arm deployment member 202 or the first hinge 302 may extend at least partially through the third opening 406. Additionally, the first axis 306 may extend through a center of the third opening 406 when the adjustment plate 204 is pivotally coupled to at least one of the paddle arm deployment member 202 or the first hinge 302.

In some embodiments, at least one of the paddle arm deployment member 202, the adjustment plate 204, or any component thereof may be rotated about at least one axes. For example, the paddle arm deployment member 202, the adjustment plate 204, other suitable components of the tray table tuning mechanism 106, or a combination thereof may be pivoted or otherwise rotated about the first axis 306. In some embodiments, the paddle arm deployment member 202 may be rotated relative to the adjustment plate 204 or vice versa. As the paddle arm deployment member 202 and/or the adjustment plate 204 rotate about the first axis 306, at least one of the slot members 404a-b may move along a respective slot(s) 402a-b. The slots 402a-b and slot members 404a-b may assist in creating a smooth and stable movement of at least one of the paddle arm deployment member 202 or the adjustment plate 204

Referring back to FIG. 2, the first screw 200a may limit a maximum rotation of the paddle arm deployment member 202 due to a portion of the slot member 404a abutting a portion of the first screw 200a. The maximum rotation of the paddle arm deployment member 202 may be adjusted by turning the first screw 200a to adjust a location of a lower end of the first screw 200a. The screw 200b may limit a maximum rotation of the adjustment plate 204 due to a portion of the adjustment plate 204 abutting a portion of the screw 200b. The maximum rotation of the adjustment plate 204 may be adjusted by turning the screw 200b to adjust a location of a lower end of the screw 200b. In some embodiments, the screw 200b may also prevent rotation of the adjustment plate 204 due to gravitational forces As best illustrated in FIG. 5, the tray table tuning mechanism 106 may include a second hinge 502 that may be positioned to extend at least partially through the second opening 308 of the paddle arm deployment member 202 and at least partially through the paddle arm 104 to enable the paddle arm 104 to pivot relative to the paddle arm deployment member 202 and to rotate about the second axis 310. The second hinge 502 may be positioned as described in the tray table tuning mechanism 106 using any suitable coupling device such as mechanical or chemical fasteners. In some embodiments, the second hinge 502 may be a friction hinge that may, for example, be press-fit into the tray table tuning mechanism 106. The second hinge 502 may be positioned in the tray table tuning mechanism 106 via other suitable techniques. Additionally as illustrated in FIG. 5, the mount members 206 may be coupled to the adjustment plate 204, the paddle arm deployment member 202, or a combination thereof.

Referring back to FIG. 2, the paddle arm 104 may be rotated relative to the paddle arm deployment member 202 between the stowed state and the deployed state. In some embodiments, the paddle arm 104 may not rotate to the deployed state until the stop member 210 has moved past a first edge 702 of the adjustment plate 204, as best illustrated in FIG. 7. In the deployed state, the stop member 210 may abut or otherwise contact at least a portion of the adjustment plate 204 to limit the rotation of the paddle arm deployment member 202 in a first direction, which, in some embodiments, may be a clockwise or counterclockwise direction about the first axis 306. Limiting the rotation of the paddle arm deployment member 202 in the first direction increases the stability of the deployed tray table 102. Additionally, a portion of the paddle arm deployment member 202 may abut at least one of the adjustment plate 204, at least one mount member 206, or the pivot limiting member 208 to limit the rotation of the paddle arm deployment member 202 in a third direction, which may be the opposite direction about the first axis 306 to the first direction. This additional rotation limitation may further increase the stability of the deployed tray table 102.

In some embodiments, in the deployed state, the stop member 210 may contact or abut other surfaces with respect to the tray table tuning mechanism 106 to limit a maximum rotation of the paddle arm 104 in at least one other directions. For example, the stop member 210 may abut a portion of the pivot limiting member 208 and or the third screw 200c to limit the maximum rotation of the paddle arm 104 in a second direction, which, in some embodiments, may be a clockwise or a counterclockwise direction about the second axis 310. The maximum rotation of the paddle arm 104 may be adjusted by turning the third screw 200c to adjust a location of a lower end of the third screw 200c. Additionally, the maximum rotation of the paddle arm 104 may determine a maximum angle of deployment of the paddle arm 104, which is independent of the adjustment plate 204, and ultimately a height of the deployed tray table 102 above the passenger seat arm 103. Therefore, the maximum angle of deployment and height of the deployed tray table 102 may be adjusted by adjusting the third screw 200c.

As best illustrated in FIG. 6, the stowed state of the paddle arm 104 may enable the tray table 102, in addition to other components of the table assembly 100, to be stored in an arm rest of a passenger seat. As the paddle arm 104 moves from the stowed state to the deployed state, at least one slot member, e.g., slot member 404a, may move along or within at least one respective slot, e.g., slot 402a, until the at least one slot member 404a abuts or contacts the first screw 200a. In some embodiments, the paddle arm 104 reaches the deployed state after the paddle arm deployment member 202 is rotated about the first axis 306 and the paddle arm 104 is rotated about the second axis 310.

Each of the components of the tray table tuning mechanism 106 (e.g., the paddle arm 104, the paddle arm deployment member 202, the adjustment plate 204, the pivot limiting member 208, etc.) may be formed via various manufacturing processes as desired. Suitable manufacturing processes include, but are not limited to, machining, forging, casting, printing, molding, combinations thereof, or other suitable processes as desired. In some embodiments, the manufacturing process used to form one component may be different from the manufacturing process used to form another component.

In the following, further examples are described to facilitate the understanding of the invention:

Example 1. A tray table tuning mechanism comprising: a pivot limiting member; a paddle arm deployment member pivotable relative to the pivot limiting member; an adjustment plate pivotable relative to the pivot limiting member; and a paddle arm pivotably coupled to the paddle arm deployment member, pivotable between a stowed state and a deployed state, and comprising at least one stop member; wherein, in the deployed state, the at least one stop member abuts a portion of the adjustment plate to limit rotation of the paddle arm deployment member in a first direction.

Example 2. The tray table tuning mechanism of any of the preceding or subsequent examples or combination of examples, wherein at least one of the paddle arm deployment member or the adjustment plate is pivotable about a first axis.

Example 3. The tray table tuning mechanism of any of the preceding or subsequent examples or combination of examples, wherein the paddle arm is pivotable about a second axis that is substantially perpendicular to the first axis.

Example 4. The tray table tuning mechanism of any of the preceding or subsequent examples or combination of examples, wherein the adjustment plate comprises at least one slot and the paddle arm deployment member comprises at least one slot member extending from the paddle arm deployment member and at least partially through the at least one slot.

Example 5. The tray table tuning mechanism of any of the preceding or subsequent examples or combination of examples, wherein the at least one slot member is moveable along the at least one slot as the paddle arm deployment member pivots.

Example 6. The tray table tuning mechanism of any of the preceding or subsequent examples or combination of examples, wherein the pivot limiting member comprises a first screw that limits a maximum rotation of the paddle arm deployment member, a second screw that limits a maximum rotation of the adjustment plate, and a third screw that limits a maximum rotation of the paddle arm.

Example 7. The tray table tuning mechanism of any of the preceding or subsequent examples or combination of examples, wherein the third screw determines an angle of deployment of the paddle arm.

Example 8. The tray table tuning mechanism of any of the preceding or subsequent examples or combination of examples, wherein, in the deployed state, the at least one stop member also abuts a portion of the pivot limiting member to limit rotation of the paddle arm in a second direction.

Example 9. A method for using a tray table tuning mechanism comprising a pivot limiting member, a paddle arm deployment member, an adjustment plate, and a paddle arm, the method comprising: rotating the paddle arm deployment member relative to the adjustment plate; and rotating the paddle arm relative to the paddle arm deployment member to a deployed state; wherein, in the deployed state, at least one stop member extending from the paddle arm abuts a portion of the adjustment plate to limit rotation of the paddle arm deployment member in a first direction.

Example 10. The method of any of the preceding or subsequent examples or combination of examples, wherein, in the deployed state, the at least one stop member extending from the paddle arm also abuts a portion of the pivot limiting member to limit rotation of the paddle arm in a second direction.

Example 11. The method of any of the preceding or subsequent examples or combination of examples, wherein rotating the paddle arm deployment member comprises rotating the paddle arm deployment member about a first axis and rotating the paddle arm comprises rotating the paddle arm about a second axis that is substantially perpendicular to the first axis.

Example 12. The method of any of the preceding or subsequent examples or combination of examples, wherein rotating the paddle arm deployment member comprises moving at least one slot member extending from the paddle arm deployment member and at least partially through at least one slot defined by the adjustment plate.

Example 13. The method of any of the preceding or subsequent examples or combination of examples, wherein a maximum rotation of the paddle arm deployment member is determined by a first screw extending from the pivot limiting member.

Example 14. The method of any of the preceding or subsequent examples or combination of examples, further comprising rotating the adjustment plate, wherein a maximum rotation of the adjustment plate is determined by a second screw extending from the pivot limiting member.

Example 15. The method of any of the preceding or subsequent examples or combination of examples, wherein a maximum rotation of the paddle arm is determined by a third screw extending from the pivot limiting member.

Example 16. A passenger seat comprising: an arm rest; and a tray table tuning mechanism coupled to the arm rest, the tray table tuning mechanism comprising: a pivot limiting member; a paddle arm deployment member pivotable relative to the pivot limiting member; an adjustment plate pivotable relative to the pivot limiting member; and a paddle arm pivotably coupled to the paddle arm deployment member, pivotable between a stowed state and a deployed state, and comprising at least one stop member; wherein, in the deployed state, the at least one stop member abuts a portion of the adjustment plate to limit rotation of the paddle arm deployment member in a first direction.

Example 17. The passenger seat of any of the preceding or subsequent examples or combination of examples, wherein the pivot limiting member is fixed relative to the arm rest.

Example 18. The passenger seat of any of the preceding or subsequent examples or combination of examples, wherein: at least one of the paddle arm deployment member or the adjustment plate is pivotable about a first axis; and the paddle arm is pivotable about a second axis that is substantially perpendicular to the first axis.

Example 19. The passenger seat of any of the preceding or subsequent examples or combination of examples, wherein: the adjustment plate comprises at least one slot and the paddle arm deployment member comprises at least one slot member extending from the paddle arm deployment member and at least partially through the at least one slot; and the at least one slot member is moveable along the at least one slot as the paddle arm deployment member pivots.

Example 20. The passenger seat of any of the preceding or subsequent examples or combination of examples, wherein the pivot limiting member comprises a first screw that limits a maximum rotation of the paddle arm deployment member, a second screw that limits a maximum rotation of the adjustment plate, and a third screw that limits a maximum rotation of the paddle arm.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A tray table tuning mechanism comprising:
    a pivot limiting member;
    a paddle arm deployment member pivotable relative to the pivot limiting member;
    an adjustment plate pivotable relative to the pivot limiting member; and
    a paddle arm pivotably coupled to the paddle arm deployment member, pivotable between a stowed state and a deployed state, and comprising at least one stop member;
    wherein, in the deployed state, the at least one stop member abuts a portion of the adjustment plate to limit rotation of the paddle arm deployment member in a first direction; and
    wherein the pivot limiting member comprises at least one of a first screw that limits a maximum rotation of the paddle arm deployment member, a second screw that limits a maximum rotation of the adjustment plate, or a third screw that limits a maximum rotation of the paddle arm.

2. The tray table tuning mechanism of claim 1, wherein at least one of the paddle arm deployment member or the adjustment plate is pivotable about a first axis.

3. The tray table tuning mechanism of claim 2, wherein the paddle arm is pivotable about a second axis that is substantially perpendicular to the first axis.

4. The tray table tuning mechanism of claim 1, wherein the adjustment plate comprises at least one slot and the paddle arm deployment member comprises at least one slot member extending from the paddle arm deployment member and at least partially through the at least one slot.

5. The tray table tuning mechanism of claim 4, wherein the at least one slot member is moveable along the at least one slot as the paddle arm deployment member pivots.

6. The tray table tuning mechanism of claim 1, wherein the third screw determines an angle of deployment of the paddle arm.

7. The tray table tuning mechanism of claim 1, wherein, in the deployed state, the at least one stop member also abuts a portion of the pivot limiting member to limit rotation of the paddle arm in a second direction.

8. A method for using a tray table tuning mechanism comprising a pivot limiting member, a paddle arm deployment member, an adjustment plate, and a paddle arm, the method comprising:
rotating the paddle arm deployment member relative to the adjustment plate; and
rotating the paddle arm relative to the paddle arm deployment member to a deployed state;
wherein, in the deployed state, at least one stop member extending from the paddle arm abuts a portion of the adjustment plate to limit rotation of the paddle arm deployment member in a first direction; and
wherein at least one of a maximum rotation of the paddle arm deployment member is determined by a first screw extending from the pivot limiting member, a maximum rotation of the adjustment plate is determined by a second screw extending from the pivot limiting member, or a maximum rotation of the paddle arm is determined by a third screw extending from the pivot limiting member.

9. The method of claim 8, wherein, in the deployed state, the at least one stop member extending from the paddle arm also abuts a portion of the pivot limiting member to limit rotation of the paddle arm in a second direction.

10. The method of claim 8, wherein rotating the paddle arm deployment member comprises rotating the paddle arm deployment member about a first axis and rotating the paddle arm comprises rotating the paddle arm about a second axis that is substantially perpendicular to the first axis.

11. The method of claim 8, wherein rotating the paddle arm deployment member comprises moving at least one slot member extending from the paddle arm deployment member and at least partially through at least one slot defined by the adjustment plate.

12. The method of claim 8, further comprising rotating the adjustment plate.

13. A passenger seat comprising:
an arm rest; and
a tray table tuning mechanism coupled to the arm rest, the tray table tuning mechanism comprising:
a pivot limiting member;
a paddle arm deployment member pivotable relative to the pivot limiting member;
an adjustment plate pivotable relative to the pivot limiting member; and
a paddle arm pivotably coupled to the paddle arm deployment member, pivotable between a stowed state and a deployed state, and comprising at least one stop member;
wherein, in the deployed state, the at least one stop member abuts a portion of the adjustment plate to limit rotation of the paddle arm deployment member in a first direction; and
wherein the pivot limiting member comprises at least one of a first screw that limits a maximum rotation of the paddle arm deployment member, a second screw that limits a maximum rotation of the adjustment plate, or a third screw that limits a maximum rotation of the paddle arm.

14. The passenger seat of claim 13, wherein the pivot limiting member is fixed relative to the arm rest.

15. The passenger seat of claim 13, wherein:
at least one of the paddle arm deployment member or the adjustment plate is pivotable about a first axis; and
the paddle arm is pivotable about a second axis that is substantially perpendicular to the first axis.

16. The passenger seat of claim 13, wherein:
the adjustment plate comprises at least one slot and the paddle arm deployment member comprises at least one slot member extending from the paddle arm deployment member and at least partially through the at least one slot; and
the at least one slot member is moveable along the at least one slot as the paddle arm deployment member pivots.

* * * * *